(12) United States Patent
Elliott et al.

(10) Patent No.: US 10,017,247 B1
(45) Date of Patent: Jul. 10, 2018

(54) ROTOR MAST ASSEMBLY

(71) Applicant: Bell Helicopter Textron Inc., Fort Worth, TX (US)

(72) Inventors: David Elliott, Azle, TX (US); Frank Bradley Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/611,813

(22) Filed: Jun. 2, 2017

(51) Int. Cl.
| | |
|---|---|
| *B64C 27/32* | (2006.01) |
| *B64C 27/04* | (2006.01) |
| *B64C 35/00* | (2006.01) |
| *B64D 35/00* | (2006.01) |
| *F16H 57/08* | (2006.01) |
| *B64C 29/00* | (2006.01) |

(52) U.S. Cl.
CPC .............. *B64C 27/32* (2013.01); *B64C 27/04* (2013.01); *B64C 29/0033* (2013.01); *B64D 35/00* (2013.01); *F16H 57/082* (2013.01)

(58) Field of Classification Search
CPC ......... B64C 27/12; B64C 27/14; B64C 27/18; B64C 27/32; B64C 27/59; B64C 27/605; B64C 29/0033; B64D 35/00; B64D 35/04; B64D 35/06; F03D 1/0666; F03D 13/20; F03D 80/88
See application file for complete search history.

(56) References Cited

U.S. PATENT DOCUMENTS

| | | | | |
|---|---|---|---|---|
| 1,589,658 | A * | 6/1926 | Pescara ................... | B64C 27/32 244/7 A |
| 2,445,354 | A * | 7/1948 | Hoppes ................... | B64C 13/30 244/17.23 |
| 2,653,779 | A * | 9/1953 | Terry ...................... | B64C 27/18 244/7 A |
| 2,947,198 | A * | 8/1960 | Stoeckicht .............. | B64C 27/12 74/665 H |
| 3,035,789 | A * | 5/1962 | Young ................. | B64C 29/0033 244/48 |
| 3,322,200 | A * | 5/1967 | Tresch .................... | B64C 27/32 416/112 |
| 4,302,154 | A * | 11/1981 | Mack ...................... | B64C 27/58 416/114 |
| 4,732,540 | A * | 3/1988 | Mouille .................. | B64C 27/32 416/134 A |
| 5,149,013 | A * | 9/1992 | Costanzo ................ | B64C 27/32 244/17.11 |
| 5,209,429 | A * | 5/1993 | Doolin .................... | B64C 27/32 244/17.11 |
| 6,676,526 | B1 * | 1/2004 | Poster ..................... | B64C 27/12 464/170 |
| 7,547,985 | B2 * | 6/2009 | Takaichi .............. | H02K 7/1838 290/44 |

(Continued)

*Primary Examiner* — Joseph W Sanderson
(74) *Attorney, Agent, or Firm* — Lightfoot & Alford PLLC (57) ABSTRACT

An aircraft rotor mast assembly that includes a composite rotor mast and a rotor housing surrounding the rotor mast. The rotor mast includes a first end, a second end, and a length therebetween. The rotor mast includes a plurality of circular openings proximate the first end to accommodate bolts for the fixation of a rotor hub to the rotor mast. The second end of the rotor mast includes a flange, wherein the flange defines a plurality of openings therethrough to accommodate the attachment of the rotor mast to a transmission.

18 Claims, 5 Drawing Sheets

(56) References Cited

U.S. PATENT DOCUMENTS

| | | | | |
|---|---|---|---|---|
| 8,985,517 B2* | 3/2015 | Ehinger | ............... | B64C 27/12 |
| | | | | 244/134 R |
| 9,623,964 B2* | 4/2017 | Baskin | ............... | B64C 27/10 |
| 9,701,406 B2* | 7/2017 | Robertson | ........... | B64C 29/0033 |
| 9,709,136 B2* | 7/2017 | Bouwer | ............... | F16H 3/663 |
| 9,725,166 B2* | 8/2017 | Baskin | ............... | B64C 27/10 |
| 2013/0172143 A1* | 7/2013 | Gasparini | ............. | F16H 57/04 |
| | | | | 475/159 |
| 2015/0125299 A1* | 5/2015 | Baskin | ............... | B64C 27/10 |
| | | | | 416/128 |
| 2015/0139799 A1* | 5/2015 | Baskin | ............... | B64C 27/10 |
| | | | | 416/112 |
| 2015/0354672 A1* | 12/2015 | Bouwer | ............... | F16H 3/663 |
| | | | | 244/62 |
| 2016/0207619 A1* | 7/2016 | Darrow, Jr. | ............ | B64C 27/12 |
| 2016/0318605 A1* | 11/2016 | Gmirya | ............... | B64C 27/10 |

* cited by examiner

ROTOR MAST ASSEMBLY

BACKGROUND

A rotorcraft, such as a tiltrotor or helicopter, includes at least one rotor mast for driving the rotor hub to transmit forces to the attached blades. One of the main overall goals in rotorcraft design is to make the rotorcraft as light as possible. Despite this desire to make everything on a rotorcraft as light as possible, it is very difficult to reduce the weight of the rotor mast. The difficulty in reducing the weight of the rotor mast is due to the tremendous loads carried through the rotor mast. Not only must the rotor mast transmit the torque from the transmission to the rotor hub, but the rotor mast must transmit the lift force created by the rotating blades to carry the full weight of the rotorcraft. In addition, the rotor mast is subject to lateral loads created by the movement of the rotorcraft as well as the wind. In order to accommodate these forces, existing rotor masts are made of steel.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In furtherance of the goal of weight reduction, this disclosure provides a rotor mast assembly including a composite rotor mast for use on rotorcraft. The disclosed rotor mast assembly may be used on any rotorcraft but is particularly well-suited for use on a tiltrotor aircraft.

Figure 1:
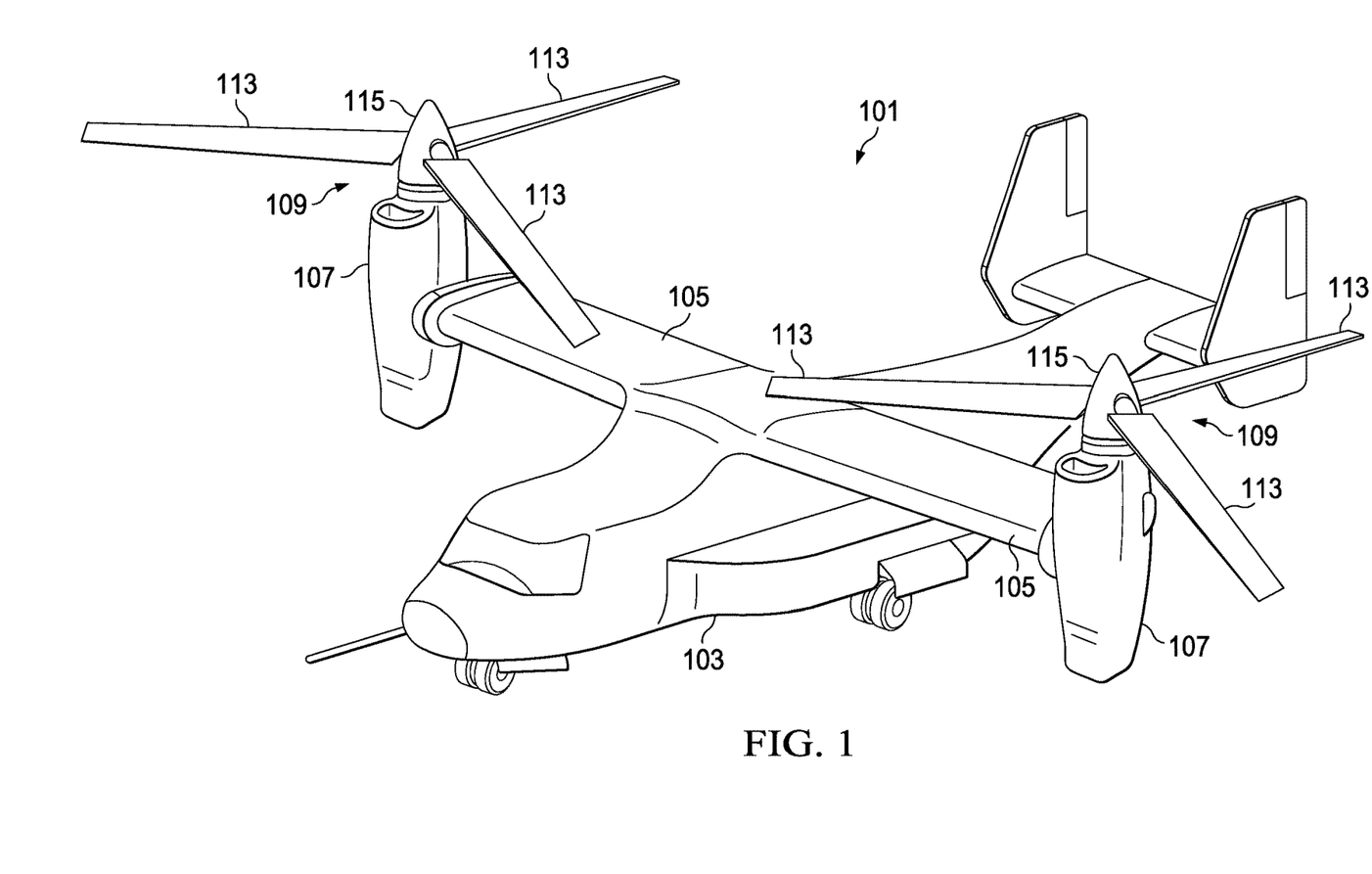
FIG. 1 is an oblique view of a tiltrotor aircraft including a rotor mast assembly according to this disclosure.

Referring to FIG. 1, a tiltrotor aircraft 101 is illustrated. Tiltrotor aircraft 101 may include a fuselage 103 with a fixed wing 105 extending therefrom. At each end of fixed wing 105 there is a rotatable nacelle 107 housing a powerplant for driving an attached proprotor 109 in rotation, each proprotor 109 having a rotor hub cover 115 and a plurality of blades 113 extending therefrom. The position of proprotors 109, as well as the pitch of blades 113, can be selectively controlled in order to selectively control direction, thrust, and lift of tiltrotor aircraft 101. FIG. 1 illustrates tiltrotor aircraft 101 in helicopter mode, in which proprotors 109 are positioned substantially vertical to provide a lifting thrust.

Figure 2:
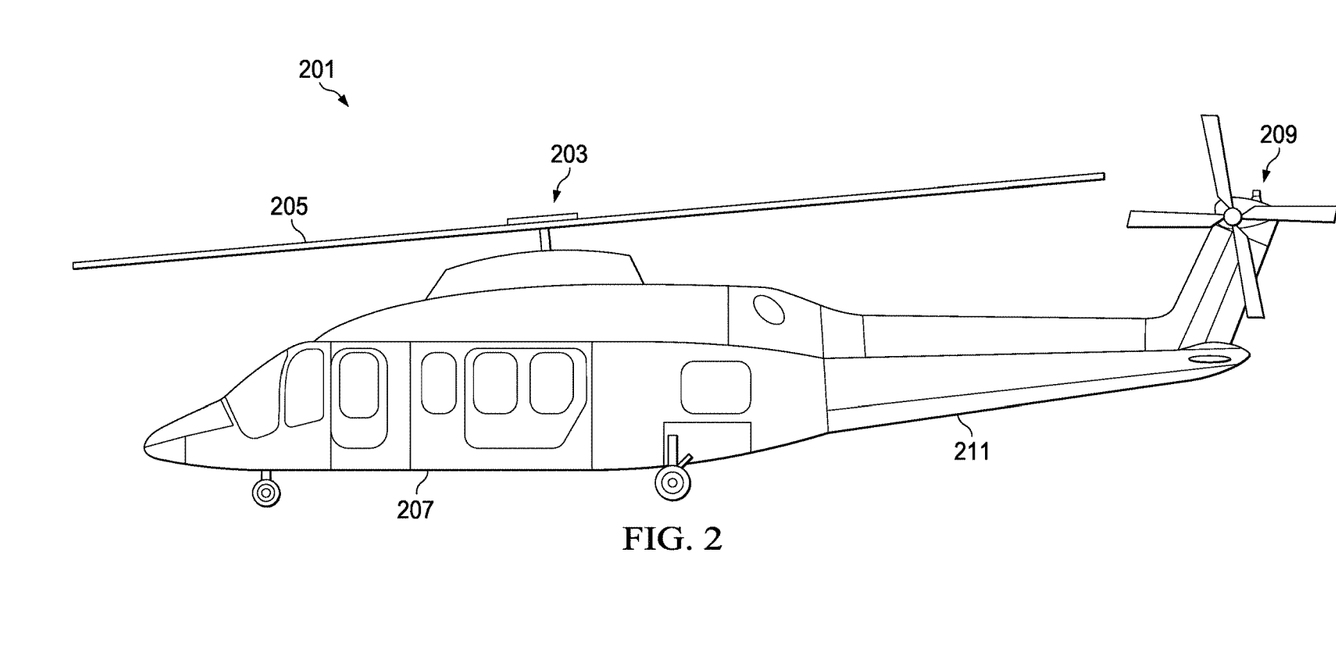
FIG. 2 is a side view of a helicopter including a rotor mast assembly according to this disclosure.

FIG. 2 illustrates a helicopter 201 that may include a main rotor 203 with blades 205, a fuselage 207, a tail 211, and a tail rotor 209. FIGS. 1 and 2 show typical rotorcraft on which the below described rotor mast assembly may be utilized.

Figure 3:
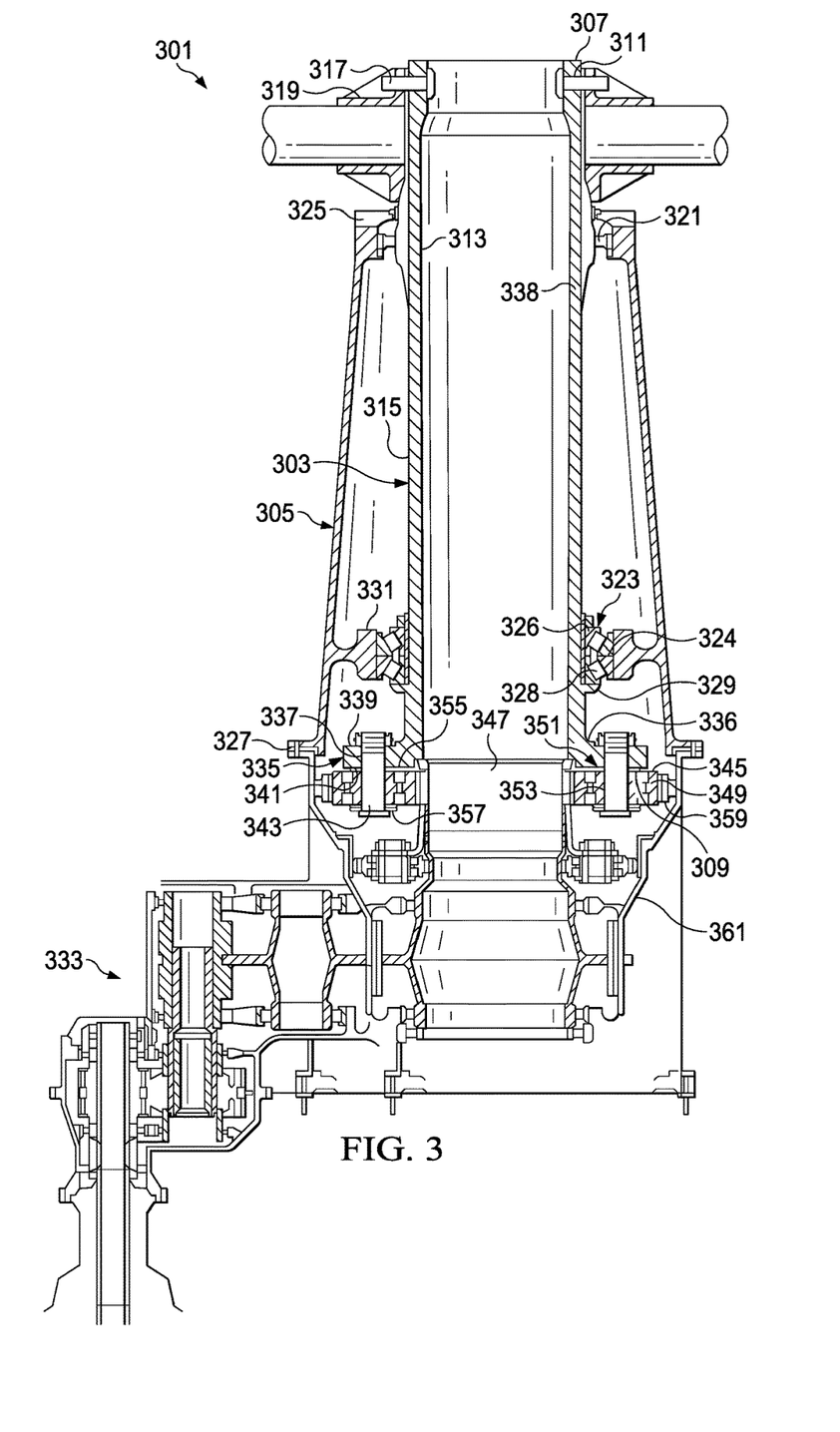
FIG. 3 is a cross-sectional view of a rotor mast assembly according to this disclosure.

Referring to FIG. 3, a rotor mast assembly 301 is illustrated. Rotor mast assembly 301 may be utilized with proprotor 109, main rotor 203, or tail rotor 209. In the embodiment shown in FIG. 3, rotor mast assembly 301 includes a rotor mast 303 and a mast housing 305, wherein rotor mast 303 is generally cylindrical and mast housing 305 is generally frusto-conical. Rotor mast 303 is made of a composite material, preferably carbon fiber and a resin. However, rotor mast 303 may be made of other suitable composite materials. Mast housing 305 may also be made of a composite material. Alternatively, mast housing 305 may be made of steel, aluminum, or any other suitable material for aircraft manufacture. Rotor mast 303 includes a first end 307 and a second end 309 and a length extending between first end 307 and second end 309. In order to facilitate attachment of rotor hub 319 to rotor mast 303, rotor mast 303 includes a plurality of circular hub attachment openings 311 extending from an interior surface 313 to an exterior surface 315. Hub attachment openings 311 are preferably located proximate first end 307. Hub attachment openings 311 are configured to receive a plurality of hub bolts 317 therethrough. Hub bolts 317 secure rotor hub 319 to rotor mast 303. Hub attachment openings 311 may be radially arranged in a single row (as shown in FIG. 3). That is, hub attachment openings 311 may be radially aligned at the same distance along the length. Alternatively, there may be two or more rows of hub attachment openings 311 located at different distances along the length to help distribute the load across a larger area of rotor mast 303. The number and spacing of hub attachment openings 311 will be dictated by the particular application.

As shown in FIG. 3, it may be advantageous to increase the wall thickness of rotor mast 303 where hub attachment openings 311 are located. This added thickness may help to overcome any structural weakness created by the presence of hub attachment openings 311. It may be preferred to add this additional thickness to interior surface 313 rather than exterior surface 315. This preference arises out the desire to maintain a constant outer diameter of rotor mast 303 along the majority of the length thereof to facilitate the positioning of a first radial bearing assembly 321 and a second radial bearing assembly 323 over rotor mast 303. Alternatively, if a particular application requires the thickness be added to the outer diameter, fabrication of rotor mast 303 could be paused prior to adding additional material so that the bearings may be added prior to the additional material.

Mast housing 305 defines a hollow interior space extending from first end 325 to second end 327. The hollow interior space is configured to receive rotor mast 303 at least partially therein so that the axis of rotation of rotor mast 303 is centrally located within mast housing 305. In addition to rotor mast 303, the hollow interior space of mast housing 305 is configured to receive first and second radial bearing assemblies 321, 323 therein. First and second radial bearing assemblies 321, 323 are configured to fit between rotor mast 303 and mast housing 305 and permit the rotation of rotor mast 303 relative to mast housing 305 while mast housing 305 provides lateral support to rotor mast 303. First and second radial bearing assemblies 321, 323 each include an outer race 324 configured to engage mast housing 305, an inner race 326 configured to engage and rotate with rotor mast 303, a spacing cage located between the inner race 326 and outer race 324, and a plurality of rollers 328 attached to the spacing cage. First radial bearing assembly 321 is located proximate a first end 325 of mast housing 305. In order to maximize the lateral support provided by mast housing 305 to rotor mast 303, first end 325 of mast housing 305 should be located as close to first end 307 of rotor mast 303 as practicable. Second radial bearing assembly 323 is located proximate a second end 327 of mast housing 305. Second end 327 of mast housing 305 may be located proximate second end 309 of rotor mast 303. Rotor mast 303 may include a ridge 329 underneath second radial bearing assembly 323 to help maintain the positioning of second radial bearing assembly 323. In addition, mast housing 305 may include a platform 331 extending radially inward to support second radial bearing assembly 323.

Rotor mast 303 is connected to a transmission 333 via a flange 335. The transition 336 from the shaft 338 of rotor mast 303 to flange 335 should be done utilizing as large and smooth of a radius as possible to minimize the stress at that junction. Flange 335 includes a plurality of circular flange apertures 337 extending from a top surface 339 to a bottom surface 341 of flange 335. A plurality of flange bolts 343 are utilized to connect flange 335 to transmission 333. The number and diameter of flange apertures 337, and corresponding flange bolts 343, will depend on the particular application.

The final step in gear reduction of transmission 333 is a planetary gear assembly 345. Planetary gear assembly 345 includes a central sun gear 347 surrounded by a plurality of planetary gears 349 that rotate about their own central axes, as well as orbit sun gear 347. Planetary gears 349 are connected via a planetary gear carrier 351, wherein planetary gear carrier 351 is preferably made of a composite material. Planetary gear carrier 351 includes a plurality of carrier apertures 353 extending therethrough from a top surface 355 of planetary gear carrier 351 to a bottom surface 357 of planetary gear carrier 351. Plurality of carrier apertures 353 correspond in number, size, and location with plurality of flange apertures 337. Accordingly, when top surface 355 of planetary gear carrier 351 is mated with bottom surface 341 of flange 335 each flange aperture 337 is coaxial with a corresponding carrier aperture 353. Insertion of flange bolts 343 through coaxial apertures 337, 353 facilitates the connection of rotor mast 303 to transmission 333. In addition, the number of carrier apertures 353 may correspond to the number of planetary gears 349 and each carrier aperture 353 may align with an opening that extends through each planetary gear 349. In such a configuration, each flange bolt 343 would extend through planetary gear carrier 351 and one of planetary gears 349. Planetary gear carrier 351 is surrounded by a ring gear 359 which is affixed to a transmission case 361 and engages with planetary gears 349 as they orbit sun gear 347.

Figure 4:
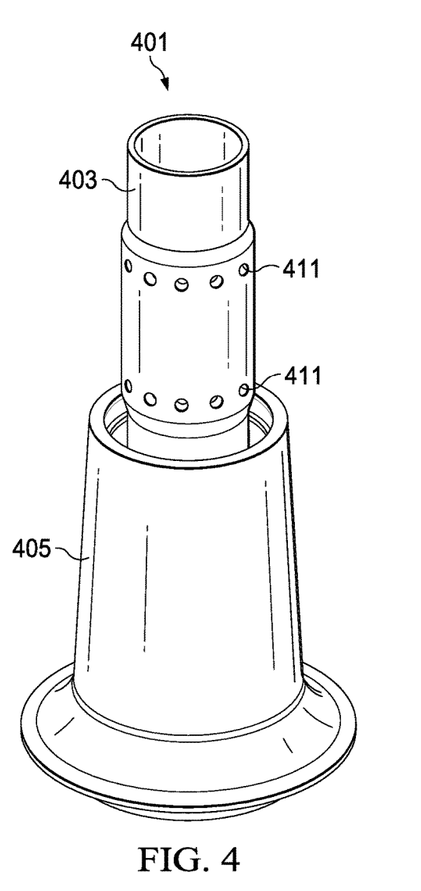
FIG. 4 is an oblique view of another rotor mast assembly according to this disclosure.
Figure 5:
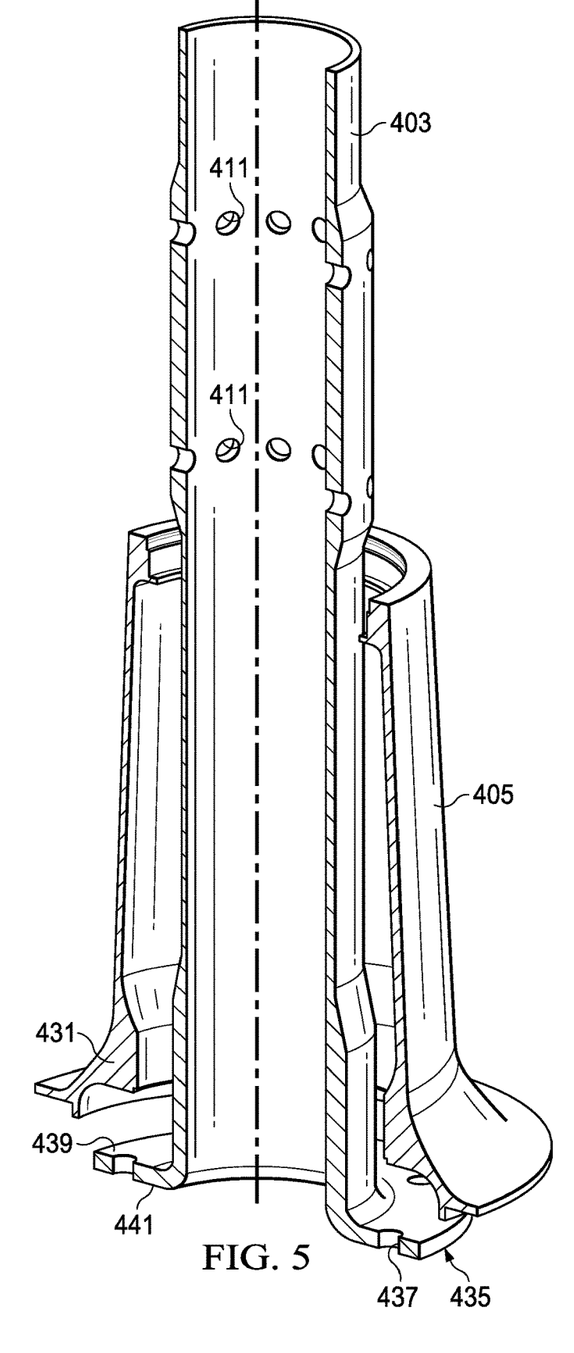
FIG. 5 is a cross-sectional oblique view of the rotor mast assembly of FIG. 4.
Figure 6:
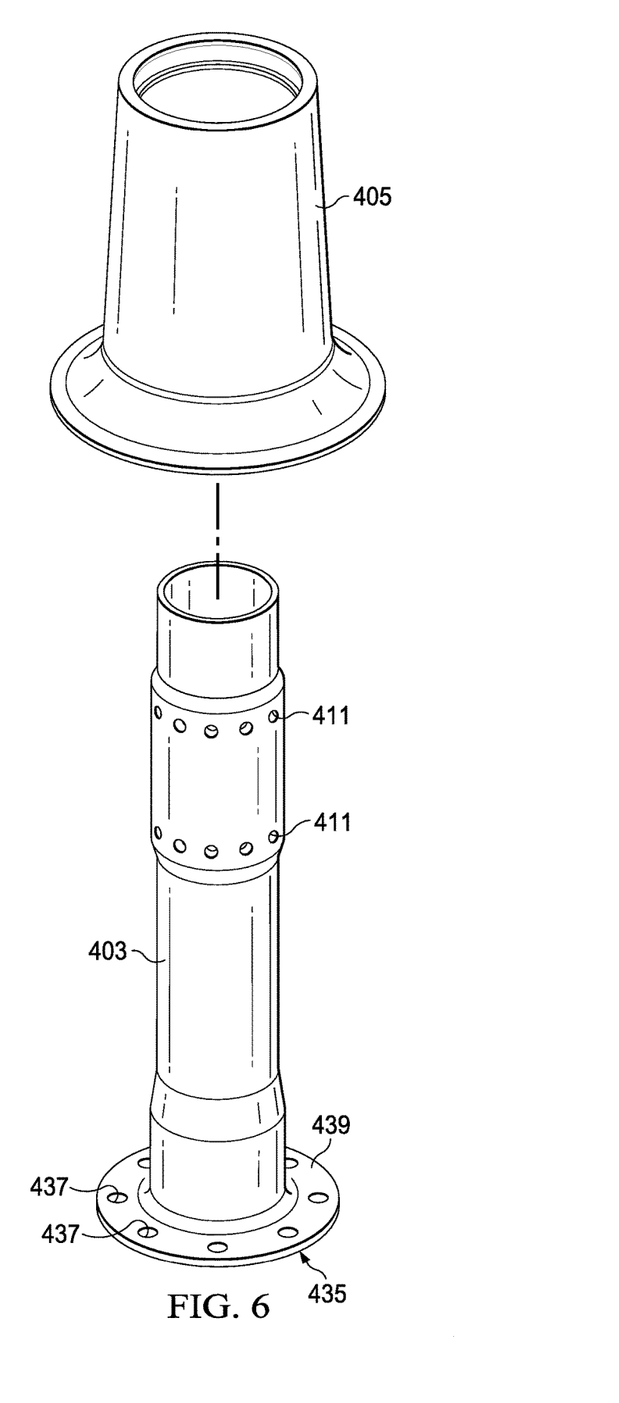
FIG. 6 is an exploded oblique view of the rotor mast assembly of FIGS. 4 and 5.

Referring to FIGS. 4-6, another embodiment of a rotor mast assembly 401 is illustrated. Rotor mast assembly 401 is similar to rotor mast assembly 301 and operates in the same manner. Accordingly, some of the duplicative elements have been omitted for simplicity. Rotor mast assembly 401 includes a rotor mast 403 and mast housing 405, wherein rotor mast 403 is constructed of a composite material and mast housing 405 may be made of a composite material. Rotor mast 403 includes two rows of circular hub attachment openings 411. Similar to rotor mast 303, rotor mast 403 is thicker adjacent hub attachment openings 411. However, while rotor mast 303 maintains a constant outer diameter along the majority of the length and adds additional material to the interior to achieve the additional thickness, rotor mast 403 maintains a constant inner diameter and adds additional material to the exterior surface to achieve the desired additional thickness.

Rotor mast 403 also includes a flange 435 for connection to a transmission (not shown). Flange 435 includes a plurality of circular flange apertures 437 extending from a top surface 439 to a bottom surface 441 of flange 435. As shown in FIGS. 5 and 6, the portion of the shaft adjacent to flange 435 is also thicker to assist in the transfer of drive forces from the transmission through flange 435 as well as lateral forces between rotor mast 403 and mast housing 405, transmitted through a radial bearing (not shown) affixed between rotor mast 403 and mast housing 405. As shown in FIG. 5, mast housing 405 includes a platform 431 with a gradually diminishing wall thickness to avoid high stress concentration.

It should be noted that a rotor mast consistent with this disclosure may include flanges at both ends, or alternatively, the rotor mast may omit the flanges and rely on radial bolts at both ends. In addition, the rotor mast may include metal banding internally, externally, or both at the locations of the hub attachment openings. Similarly, the flanges may include supplemental metal plating on top, bottom, or both.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor mast assembly, comprising:
a rotor mast having a first end, a second end, a length extending therebetween, and a midpoint of the length, the rotor mast defining a plurality of circular openings located closer to the first end than the midpoint of the length, the plurality of circular openings extending from an inner surface to an outer surface and having axes that are perpendicular to an axis of rotation of the rotor mast, the rotor mast further including a flange located closer to the second end of the rotor mast than the midpoint thereof, the flange defining a plurality of circular apertures extending from a top surface of the flange to a bottom surface of the flange, the rotor mast having a constant outer diameter along the length thereof from the first end to at least the midpoint of the length, the rotor mast being made of a composite material; and
a mast housing having a first end, a second end, a length extending therebetween, and a midpoint of the length, the mast housing defining a hollow interior space extending from the first end to the second end of the mast housing, the hollow interior space being configured to receive at least a portion of the rotor mast therein, the first end of the mast housing being longitudinally positioned between the midpoint of the rotor mast and the first end of the rotor mast;
wherein the flange is configured to receive torque from a transmission to cause rotation of the rotor mast.

2. The rotor mast assembly of claim 1, further comprising:
a first radial bearing radially located between the rotor mast and the mast housing, the first radial bearing being longitudinally positioned between the first end and the midpoint of the mast housing and longitudinally positioned between the first end and the midpoint of the rotor mast; and
a second radial bearing radially located between the rotor mast and the mast housing, the second radial bearing being longitudinally positioned between the midpoint and the second end of the mast housing, wherein the first and second radial bearings are coaxial with the rotor mast;
wherein each of the first and second radial bearings include an outer race in contact with the mast housing, an inner race in contact with the rotor mast, and a plurality of rolling elements between the outer race and the inner race.

3. The rotor mast assembly of claim 2, further comprising:
a planetary gear carrier made of a composite material, the planetary gear carrier defining a plurality of apertures, wherein the plurality of apertures in the planetary gear carrier are sized and spaced such that when a top surface of the planetary gear carrier is placed adjacent to the bottom surface of the flange of the rotor mast the plurality of apertures in the flange are coaxial with the plurality of apertures in the planetary gear carrier.

4. The rotor mast assembly of claim 1, wherein the mast housing is made of a composite material.

5. The rotor mast assembly of claim 1, wherein the mast housing has an outer diameter perpendicular to the length of the mast housing, wherein the outer diameter increases from the first end towards the second end along a majority of the length of the mast housing.

6. The rotor mast assembly of claim 1, wherein the flange extends radially outward.

7. A rotor mast assembly, comprising:
a rotor mast having a first end, a second end, a length extending therebetween, and a midpoint of the length, the rotor mast defining a plurality of circular openings located closer to the first end than the midpoint of the length, the plurality of circular openings having axes that are perpendicular to an axis of rotation of the rotor mast, the rotor mast being hollow along the majority of the length thereof, the rotor mast further including a second end flange located closer to the second end of the rotor mast than the midpoint thereof, the second end flange defining a plurality of circular apertures extending from a top surface of the second end flange to a bottom surface of the second end flange, the rotor mast having a varying outer diameter along the length thereof, the rotor mast being made of a composite material; and
a mast housing having a first end, a second end, a length extending therebetween, and a midpoint of the length, the mast housing defining a hollow interior space extending from the first end to the second end of the mast housing, the hollow interior space being configured to receive at least a portion of the rotor mast therein, the first end of the mast housing being longitudinally positioned between the midpoint of the rotor mast and the first end of the rotor mast;
wherein the second end flange is configured to receive torque from a transmission to cause rotation of the rotor mast.

8. The rotor mast assembly of claim 7, further comprising:
a first radial bearing radially located between the rotor mast and the mast housing, the first radial bearing being longitudinally positioned between the first end and the midpoint of the mast housing and longitudinally positioned between the first end and the midpoint of the rotor mast; and
a second radial bearing radially located between the rotor mast and the mast housing, the second radial bearing being longitudinally positioned between the midpoint and the second end of the mast housing, wherein the first and second radial bearings are coaxial with the rotor mast;
wherein each of the first and second radial bearings include an outer race in contact with the mast housing, an inner race in contact with the rotor mast, and a plurality of rolling elements between the outer race and the inner race.

9. The rotor mast assembly of claim 8, further comprising:
a planetary gear carrier made of a composite material, the planetary gear carrier defining a plurality of apertures, wherein the plurality of apertures in the planetary gear carrier are sized and spaced such that when a top surface of the planetary gear carrier is placed adjacent to the bottom surface of the second end flange of the rotor mast the plurality of apertures in the flange are coaxial with the plurality of apertures in the planetary gear carrier.

10. The rotor mast assembly of claim 7, wherein the mast housing is made of a composite material.

11. The rotor mast assembly of claim 7, wherein the mast housing has an outer diameter perpendicular to the length of the mast housing, wherein the outer diameter increases from the first end towards the second end along a majority of the length of the mast housing.

12. The rotor mast assembly of claim 7, wherein the second end flange extends radially outward.

13. A rotorcraft, comprising:
a fuselage;
a powerplant;
a transmission connected to the powerplant;
a rotor mast connected to the transmission, the rotor mast having a first end, a second end, a length extending therebetween, and a midpoint of the length, the rotor mast defining a plurality of circular openings located closer to the first end than the midpoint of the length, the plurality of circular openings extending from an inner surface to an outer surface and having axes that are perpendicular to an axis of rotation of the rotor mast, the rotor mast further including a flange located closer to the second end of the rotor mast than the midpoint thereof, the flange defining a plurality of circular apertures extending from a top surface of the flange to a bottom surface of the flange, the rotor mast being made of a composite material; and
a mast housing having a first end, a second end, a length extending therebetween, and a midpoint of the length, the mast housing defining a hollow interior space extending from the first end to the second end of the mast housing, the hollow interior space being configured to receive at least a portion of the rotor mast therein, the first end of the mast housing being longitudinally positioned between the midpoint of the rotor mast and the first end of the rotor mast;
wherein the rotorcraft is configured to drive the rotor mast in rotation using torque generated by the powerplant and transferred through the transmission.

14. The rotorcraft of claim 13, further comprising:
a first radial bearing radially located between the rotor mast and the mast housing, the first radial bearing being longitudinally positioned between the first end and the midpoint of the mast housing and longitudinally positioned between the first end and the midpoint of the rotor mast; and
a second radial bearing radially located between the rotor mast and the mast housing, the second radial bearing being longitudinally positioned between the midpoint and the second end of the mast housing, wherein the first and second radial bearings are coaxial with the rotor mast;
wherein each of the first and second radial bearings include an outer race in contact with the mast housing, an inner race in contact with the rotor mast, and a plurality of rolling elements between the outer race and the inner race.

15. The rotorcraft of claim 14, further comprising:
a planetary gear carrier made of a composite material, the planetary gear carrier defining a plurality of apertures, wherein the plurality of apertures in the planetary gear carrier are sized and spaced such that when a top surface of the planetary gear carrier is placed adjacent to the bottom surface of the flange of the rotor mast the plurality of apertures in the flange are coaxial with the plurality of apertures in the planetary gear carrier.

16. The rotorcraft of claim 13, wherein the mast housing is made of a composite material.

17. The rotorcraft of claim 13, wherein the mast housing has an outer diameter perpendicular to the length of the mast housing, wherein the outer diameter increases from the first end towards the second end along a majority of the length of the mast housing.

18. The rotorcraft of claim 13, wherein the flange extends radially outward.

* * * * *